United States Patent Office 2,693,453
Patented Nov. 2, 1954

2,693,453

PREPARATION OF CATION EXCHANGE MATERIAL FROM COAL

Martinus L. Goedkoop, Geleen, Netherlands, assignor to De Directie van de Staatsmijnen in Limburg, Handelend voor en namens de Staat der Nederlanden, Heerlen, Netherlands No Drawing. Application March 16, 1951, Serial No. 216,097

Claims priority, application Netherlands March 21, 1950

5 Claims. (Cl. 252—179)

This invention relates to the manufacture of cation exchange materials from carbonaceous solid substances, such as coal, semi coke, precarbonized peat and lignite.

FIELD OF INVENTION

It has been found that cation exchange materials of a very useful nature can be prepared in a rather simple manner from carbonaceous solid substances, such as bituminous coal, anthracite and precarbonized lignite and peat or the like, by heating the carbonaceous material in oxygen or in a free oxygen-containing gas at a temperature within the range of 80 to 450° C. and then hydrolyzing the reaction product in a mildly alkaline medium. Such a process is disclosed in copending patent application, Ser. No. 177,764, of Martinus L. Goedkoop, filed August 4, 1950.

This new type of operation constitutes a decided improvement over the previously known methods of treating carbonaceous materials to obtain cation exchange materials using dehydrated agents, such as concentrated sulfuric acid. Thus, in contrast to the older methods, the new procedures eliminate loss of valuable products and reactants and produce cation exchange materials which are more uniform in size. Nevertheless, these new procedures have certain aspects which can stand improvement. For example, the heating period required in the new operations is quite long in some cases, thus adding to the expense of the operations and possible diminution in yield.

OBJECTS

A principal object of this invention is the provision of new improvements in the manufacture of cation exchange materials from solid carbonaceous substances. Further objects include:

(1) The provision of such procedures which make possible the formation of cation exchange materials of relatively high activity, capable of regeneration after use many times, and of desirable uniform particle size.

(2) The provision of improvements in the method of making cation exchange materials by heating carbonaceous solid substances in oxygen-containing gases and then hydrolyzing the reaction product in an alkaline medium, whereby the heating period is greatly shortened.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

GENERAL DESCRIPTION

These objects are accomplished according to the present invention by a process which comprises heating a subdivided solid carbonaceous substance in a stream of gas containing free oxygen and also containing a nitrous vapor to a temperature between 80 and 450° C. and then hydrolyzing the reaction product in an alkaline medium.

Although the process may be carried out as a batch operation, it is preferably conducted as a continuous process with recycling of the nitrous vapors. It is also preferable to circulate heating and treating gas at such velocities that the subdivided carbonaceous material is fluidized by the gas stream in the reaction vessel during the heating operation.

EXAMPLES

A more complete understanding of the new procedures of this invention may be had by reference to the following examples of actual operations in accordance with the invention.

Example I

This example illustrates the production of a cation exchange material in accordance with this invention.

In a fluidizing tube (diameter 5 cm.), 200 g. of semi-anthracite (grain size 0.3 to 1.0 mm.) were heated in a fluidized state for 22 hours at a temperature of 300° C. by means of a hot air stream which contained nitrous vapors as follows:

15 litres air mixed with 1 litre nitrous vapors were passed per minute into the fluidizing tube, the nitrous vapors being the final discharge gas obtained in the manufacture of nitric acid.

The reaction product was treated for 30 minutes with 3 litres of a boiling sodium hydroxide solution (1 N). After being filtered, the hydrolyzed product was rinsed with distilled water. The weight of the dried reaction product was about equal to that of the starting material.

Example II

This example illustrates the use of the cation exchange material produced in Example I for the softening of tap water and the repeated regeneration of the cation exchange material.

The reaction product of Example I was used for softening tap water (degrees of hardness=16.4 mg. CaO per 100 ml.). To this end, softening tests were performed with test portions of the reaction product each weighing 10 grams.

In a tube, having a diameter of 22 mm., the water to be softened was passed at a rate of 4 to 5 ml. per minute through the layer of cation exchange material which had been disposed on top of a perforated plate. The amount of water passed until the cation exchange material broke down (until the outflowing water contained calcium) was measured.

After 2.9 litres tap water had passed, the cation exchanger proved to have broken down. Subsequently, the cation exchange material was regenerated by passing a 10% sodium chloride solution at a rate of 1 to 2 ml. per minute through the bed of material. After 300 ml. of the sodium chloride solution had been passed, the regeneration liquor contained 330 mg. calcium (calculated as calcium oxide). After being rinsed with distilled water, the ion exchange material could be re-used.

After this first regeneration, the cation exchange material broke down after 2.1 litres tap water had passed.

After a second regeneration, which was carried out in the above manner (the regeneration liquor contained 320 mg. calcium oxide), the ion exchange material broke down after 2.1 litres tap water had passed.

After a third regeneration (the regeneration liquor contained 335 mg. calcium oxide), the breakdown was again observed after 2.1 litres water had passed.

In the fourth regeneration, the treatment with 300 ml. sodium chloride solution (the regeneration liquor contained 300 mg. calcium oxide), was followed by a further regeneration with 300 ml. hydrochloric acid (1 N) (the regeneration liquor contained 140 mg. calcium oxide).

Now, the breakdown occurred after 2.5 litres tap water had passed. The fifth regeneration was carried out with 300 ml. hydrochloric acid (1 N) when the regeneration liquor proved to contain 340 mg. calcium oxide.

DETAILED DESCRIPTION

The term "nitrous vapors" as employed in this specification and in the appended claims is intended to denote any gas-or vapor-containing nitrogen in combination with oxygen, such as nitric acid vapors or other gases containing nitrogen oxides, particularly those containing nitric oxide. The nitrous vapors, which in the manufacture of nitric acid are obtained as a final gas and which are usually discharged through the stack as a valueless product, have proved to be very suitable for the process according to the invention.

The amount of the nitrous vapors admixed is not material, but it is preferred to use only small amounts of nitrous vapors, e. g., less than 10% by volume of the oxidizing gas mixture, because these small amounts are sufficient to give good results. Larger amounts of nitrous vapors may be used even to the extent of heating the starting material in a medium which largely consists of nitrous vapors. With these high concentrations, however, there is the formation of reaction products of a lower molecular weight to be taken into account.

The process according to the invention is carried out in an analogous manner, as has been set forth in the aforementioned application and, it is desirable to maintain the starting material in a fluidized state while being heated in the oxidizing gas.

The nitrous vapors contained in the discharged reaction gases may be re-used so that the process according to the invention can be carried out as a cyclic process, the nitrous vapors being regenerated in the well-known manner; for example with sulfuric acid.

As indicated, the solid carbonaceous substances should be heated to a temperature between 80 and 450° C. For most desirable results, giving a product having the smallest amount of soluble components and the highest cation exchange activity, temperatures between 220 and 350° C. should be used.

The length of time of heating and contact of the carbonaceous substances with the oxygen and nitrous vapor-containing gas stream will depend primarily upon the temperature employed and the nature of the carbonaceous material being treated. Hence, this will vary from case to case, but under most ordinary circumstances, it has been found that a time between 8 and 96 hours is most desirable.

The amount of gas used in the process is governed to a large extent by the nature of the apparatus used in the process, heat losses, and the like, and is generally controlled so as to maintain the temperature of the carbonaceous substances within the range indicated above. However, in the preferred type of operation, a sufficient velocity in the flow of the treating gas should be maintained so as to fluidize the particles of carbonaceous substances and, here again, the exact numerical values on volume and flow will depend upon the apparatus and also the density and size of the carbonaceous substances.

The carbonaceous substances under treatment should be subdivided, preferably to a uniform size. The exact degree of subdivision is not critical, but the most useful type of product has been found to be obtained when a particle size between 0.1 and 1 mm. is used. This size is also especially useful when the fluidizing operation is employed.

Although it has been found that some carbonaceous solid substances are more satisfactorily employed in the process than others, the operation is usable generally with all such materials as coal, either bituminous or anthracite, semi-coke, petroleum coke and precarbonized lignite or precarbonized peat. However, the preferred substances include semi-anthracite and low volatile bituminous coal.

After the heating step is terminated, the reaction product is subjected to hydrolysis in an alkaline medium. Many materials can be used to form the alkaline medium, such as the salts of weak acids, for example, metal carbonates, phosphates, or the like, but preferably, alkali metal hydroxides are used.

The concentration of the alkaline medium can be varied, although for the most desirable products, an alkaline medium corresponding to that resulting from a 2 to 5% solution of sodium hydroxide is employed.

After the alkaline hydrolysis, the insoluble resulting product is separated from the treating solution by decantation and is then rinsed with water or with dilute acids. The resulting cation exchange material is then ready for use in any of the places or manner in which these substances are known to be useful.

CONCLUSIONS

Through the use of the new procedures, as described above, it is possible to make cation exchange materials cheaply and easily from readily available basic materials, such as coal, semi-coke, precarbonized lignite or precarbonized peat or the like. The products are obtained in desirable size and in a simple manner. One of the main advantages derived by these new improvements is the reduction in time of heating required to make the exchange materials, which may be two or three times as short as the heating periods required where these new improvements are not employed.

I claim:

1. A process for the manufacture of cation exchange material which comprises heating, in a medium of a free oxygen-containing gas, containing nitrous vapor in an amount up to 10% by volume and at a temperature within the range of from 220° to 350° C. coal which is oxidizable but not completely decomposable under the conditions employed and which is of about 0.1 to 1 mm. particle size, continuing said heating until said material is oxidized, subsequently hydrolzing the oxidized product by treatment thereof with a hot aqueous strongly alkaline solution and thereafter separating the hydrolyzed product from said solution, the time of heating the initial coal being such that the particle size of the cation exchanger is substantially the same grain size as that of the starting material.

2. The process of claim 1, wherein the particles are fluidized during said heating in said gas stream.

3. The process of claim 1, wherein the coal is semi-anthracite coal.

4. The process of claim 1, wherein the coal is bituminous coal.

5. The process of claim 1 wherein hydrolysis is effected by treating said product with a 2 to 5% aqueous sodium hydroxide solution.

References Cited in the file of this patent

UNITED STATES PATENTS

| Number | Name | Date |
| --- | --- | --- |
| 2,309,363 | Urbain et al. | Jan. 26, 1943 |
| 2,338,634 | Fuchs | Jan. 4, 1944 |

FOREIGN PATENTS

| Number | Country | Date |
| --- | --- | --- |
| 547,580 | Great Britain | Sept. 2, 1942 |